(12) United States Patent
Bulakci et al.

(10) Patent No.: US 12,101,679 B2
(45) Date of Patent: Sep. 24, 2024

(54) SURVIVAL TIME AWARE MOBILITY

(71) Applicant: Nokia Technologies Oy, Espoo (FI)

(72) Inventors: Ömer Bulakci, Munich (DE); Ahmad Awada, Munich (DE); Jedrzej Stanczak, Wroclaw (PL); Srinivasan Selvaganapathy, Bangalore (IN); Muhammad Naseer-Ul-Islam, Munich (DE); Amaanat Ali, Espoo (FI); Rakash Sivasiva Ganesan, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/556,976

(22) PCT Filed: May 4, 2022

(86) PCT No.: PCT/FI2022/050293
§ 371 (c)(1),
(2) Date: Oct. 24, 2023

(87) PCT Pub. No.: WO2022/238613
PCT Pub. Date: Nov. 17, 2022

(65) Prior Publication Data
US 2024/0205785 A1 Jun. 20, 2024

(30) Foreign Application Priority Data
May 12, 2021 (IN) .............................. 202141021513

(51) Int. Cl.
*H04W 36/36* (2009.01)
(52) U.S. Cl.
CPC .............................. *H04W 36/362* (2023.05)

(58) Field of Classification Search
CPC ................................................... H04W 36/362
See application file for complete search history.

(56) References Cited

U.S. PATENT DOCUMENTS

| 2020/0022035 | A1 | 1/2020 | Kadiri et al. |
| 2024/0049091 | A1* | 2/2024 | Naseer-Ul-Islam ........................ H04W 36/302 |
| 2024/0107399 | A1* | 3/2024 | Naseer-Ul-Islam .. H04W 36/36 |

FOREIGN PATENT DOCUMENTS

| WO | 2020/091661 A1 | 5/2020 |
| WO | 2022/042948 A1 | 3/2022 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

(Continued)

*Primary Examiner* — Minh Chau Nguyen
(74) *Attorney, Agent, or Firm* — Nokia Technologies Oy

(57) ABSTRACT

The present invention relates to survival time aware mobility and presents handover procedures when considering survival time (ST) requirements. It proposes a mechanism and embodiments to allow a target cell to have the information relating to a joining UE's Survival Time requirements as well as the ST status during the handover procedure. In particular, the invention is aimed at being introduced into the mobility procedures: Baseline Handover (BHO), Conditional HO (CHO), and Dual Active Protocol Stack (DAPS) HO. In addition to the aggregated RAN architecture, the mobility procedures can be applicable to disaggregated RAN architecture, e.g., CU-DU split.

16 Claims, 10 Drawing Sheets

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.1.0, Mar. 2020, pp. 1-438.

"3rd Generation Partnership Project; Technical Specification Group Services and System Aspects; Service requirements for cyber-physical control applications in vertical domains; Stage 1 (Release 17)", 3GPP TS 22.104, V17.2.0, Dec. 2019, pp. 1-76.

"Msc-generator", Sourceforge, Retrieved on Oct. 6, 2023, Webpage available at : https://sourceforge.net/projects/msc-generator/.

"3rd Generation Partnership Project; Technical Specification Group Services and System Aspects; System architecture for the 5G System (5GS); Stage 2 (Release 16)", 3GPP TS 23.501, V16.5.0, Jul. 2020, pp. 1-441.

"3rd Generation Partnership Project; Technical Specification Group Radio Access Network; NG-RAN; NG Application Protocol (NGAP) (Release 16)", 3GPP TS 38.413, V16.2.0, Jul. 2020, pp. 1-462.

"3rd Generation Partnership Project; Technical Specification Group Radio Access Network; NG-RAN; Architecture description (Release 16)", 3GPP TS 38.401, V16.1.0, Mar. 2020, pp. 1-50.

"The Need for survival time in TSC Assistance Information", 3GPP TSG-SA WG2 Meeting #132, S2-1903640, Samsung, Apr. 8-12, 2019, 4 pages.

"(TP for NR_IIOT_URLLC_enh BL CR for TS 38.423) Impact of handover on Survival Time", 3GPP TSG-RAN WG3 Meeting #113-e, R3-213448, Agenda: 21.3, Nokia, Aug. 16-26, 2021, 2 pages.

"RAN3 impacts of Survival Time", 3GPP TSG-RAN WG3 Meeting #112-e, R3-21xxxx, Agenda: 21.3, Nokia, May 17-28, 2021, 4 pages.

"(TP for NR_IIOT_URLLC_enh BL CR for TS 38.423) Resolution of open issues for Survival Time", 3GPP TSG-RAN WG3 Meeting #115-e, R3-22xxxx, Agenda: 21.3, Nokia, Feb. 21-Mar. 3, 2022, 7 pages.

International Search Report and Written Opinion received for corresponding Patent Cooperation Treaty Application No. PCT/FI2022/050293, dated Aug. 4, 2022, 16 pages.

"Introduction of the survival Time", 3GPP TSG-RAN3 Meeting #112-e, R3-211905, Agenda: 21.3, Huawei, May 17-28, 2021, 9 pages.

"Survival time support in 5GS", 3GPP TSG-RAN WG2 Meeting #105, Agenda: 11.7.4, CATT, Feb. 25-Mar. 1, 2018, pp. 1-6.

"3rd Generation Partnership Project; Technical Specification Group Services and System Aspects; Study on enhanced support of Industrial Internet of Things (IIoT) in the 5G System (5GS) (Release 17)", 3GPP TR 23.700-20, V17.0.0, Mar. 2021, pp. 1-88.

"(TP for NR_IIOT_URLLC_enh BL CR for TS 38.423) Survival Time and handover", 3GPP TSG-RAN WG3 Meeting #114-e, R3-214830, Agenda: 21.3, Nokia, Nov. 1-11, 2021, 4 pages.

* cited by examiner

SURVIVAL TIME AWARE MOBILITY

RELATED APPLICATION

This application was originally filed as PCT Application No. PCT/FI2022/050293 on May 4, 2022, which claims priority from Indian Provisional Application No. 202141021513, filed on May 12, 2021, both of which are incorporated herein by reference in their entirety.

TECHNICAL FIELD

The present invention relates to a wireless communication, and more particularly, enabling survival time awareness during the mobility procedures. Some example embodiments may generally relate to communications including mobile or wireless telecommunication systems, such as Long Term Evolution (LTE) or fifth generation (5G) radio access technology or new radio (NR) access technology, or other communications systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system can be built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IOT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named gNB when built on NR radio and may be named next-generation eNB (NG-eNB) when built on E-UTRA radio.

Critical Industrial IoT (IIoT) Traffic is typically defined with ultra-reliable and low-latency communications (URLLC) characteristics, requiring very high reliability of sending a packet within a strict delay budget. Nevertheless, various IIoT services can still continue the correct operation when a few packets are not correctly received. This notion is referred to as the survival time (ST) of the service.

The ST is defined in 3GPP TS 22.104 as "The maximum survival time indicates the time period the communication service may not meet the application's requirement before there is a failure such that the communication service is deemed to be in an unavailable state" and "The time that an application consuming a communication service may continue without an anticipated message."

Accordingly, the ST can be inferred as the time and/or number of continuous packet losses and/or packets missing the arrival within required time budget for given traffic flow. Beyond this limit the receiver of the traffic may, e.g., shut down the receiver operation due to safety measures. Hence, successful delivery of the packets before expiry of survival time is one main criterion or quality of service (QOS) requirement for the RAN network. A 3GPP study item in SA2, see TR23.700-20, has introduced the key issue of "Use of Survival Time for Deterministic Applications in 5GS" which studies the inclusion of the ST information in the time sensitive communications (TSC) assistance information (TSCAI) per QoS flow, which is provided from the 5G core network (5GC) to the (R)AN. The ST information can be obtained, e.g., via the application function (AF) and can be provided to the session management function (SMF). The ST can be utilized by RAN to handle the QoS requirements of a service. The ST is service dependent and can vary, e.g., in the order of 2× transfer interval value where transfer interval is 5 ms for cooperative carrying use case. Here, transfer interval can be defined as the time difference between two consecutive transfers of application data from an application via the service interface to 3GPP system. Accordingly, the ST may be obtained by (radio) access network (R)AN from core network (CN). Nevertheless, there could be other means of obtaining the ST information, e.g., from a device or user equipment (UE) or configuration, e.g., from a management entity.

FIG. 1 illustrates the concept of survival time and the tolerance of packet loss within survival time requirements. Therein, an example packet flow is provided where the ST is equal to the 3 consecutive packet errors. In Case A, since fewer than 3 consecutive packet errors are experienced, the service is in Up State. However, in case B, when the service experiences 3 consecutive packet errors, the service enters the Down State, which may result in severe financial costs, as the production may stop. It is noted that, in this example, ST is based on consecutive packets. Nevertheless, other means for defining the ST can be utilized, e.g., in terms of absolute time. Moreover, the ST can also be based on the packet bursts. In this case, ST can be defined in terms of consecutive burst losses. The transfer interval can then relate to packet burst or simply burst periodicity. Herein, for simplicity, different embodiments make use of the notion of packets; however, any embodiment can be generalized to packet bursts or simply bursts.

The main benefit of the ST awareness in 5GS is that 5GS is able to provide "overall packet error ratio-PER" that matches better with the actual application requirements and achieve much higher network efficiency for URLLC/TSC traffic flows. If ST is known, for example, 5GS can use most of the time with lower target packet error rate (PER), and switch to higher target PER only if survival time is about to exceed.

For example, assume a service with overall PER=1e-8 (e.g., based on the QoS profile), then, e.g.,
  If ST is known, 5GS could use target PER=1e-3 for ~99.9% of the time, and target PER ~1e-8 for ~0.1% of the time.
  If ST is NOT known, 5GS would need to use target PER=1e-8 for all packets.

Accordingly, ST awareness results in higher URLLC efficiency, which implies
  Higher overall capacity (fewer resources reserved for URLLC).

Improved overall reliability and latency for URLLC traffic (in system level it can reduce the probability of resource conflict with other URLLC traffic).

Larger number of URLLC devices can be supported.

Survival Time (ST) reflects the fundamental characteristics of Industry 4.0 services and shapes the RAN handling of the services. Various Industry 4.0 services require mobility support, e.g., Automated Guided Vehicles (AGVs), collaborative robots, and modular robots.

As different services can have different STs, therefore there is a strong need for considering the ST in mobility procedures. However, during mobility, the target cell is not aware of the ST status thus, it cannot use this information in admission control and in adapting the RRM procedures properly.

Using handover procedure, the UE's serving cell changes to a new cell, i.e., target cell, which may be aware of the survival time requirement of a service but not of the current ST status of the UE in terms of missed number of packets. The packets can be missed not only because of weak radio conditions in the source cell but also by the outage during the handover (e.g., due to HO interruption time). Currently, the target cell does not have enough information to decide on the number of radio resources it shall reserve for the UE and/or whether it shall admit the UE (i.e., accept the handover request) or not. This is because UEs with small ST headroom (defined as ST-ST counter determining the number of missed packets herein) would require many more radio resources than UEs with higher ST headroom. As such, the target gNB may have to reserve more radio resources for UE with small ST headroom and fewer resources for UE with high ST headroom.

Moreover, without the embodiments herein, the target cell does not have enough information on how it shall tailor its scheduling/transmission modes/lower layer configurations depending on the status of the ST without radio resource over-provisioning.

That is, with the ST status, the target cell can tailor its scheduling/transmission modes/lower layer configuration depending on the ST status increasing the system efficiency in terms of radio resources. Therefore, there is a need to make mobility procedures ST aware such that the target cells are made aware of the incoming UE's ST requirements as well as the ST status during the mobility procedure(s).

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose to present some concepts of the subject matter in a simplified form as a prelude to the more detailed description that is presented later. The invention is set out in the appended set of claims.

The present invention introduces the Survival Time (ST) awareness during the mobility procedures including Baseline Handover (BHO), Conditional HO (CHO), and Dual Active Protocol Stack (DAPS) HO.

According to the preferred embodiment, the ST status is communicated to the target cell in the following manner: the source cell provides the ST status i.e., ST-Y and/or ST-Y-X to the target gNB along with the HO request, where Y is the time since the last successful reception of the packet and X is an estimated HO interruption time. ST-Y-X and/or ST-Y can be defined as the available survival time (AST) for the target cell to transmit the next packet to the UE successfully. The target cell can perform admission control taking into account the ST status of the UE and the currently available radio resource. Subsequently, the UE can report the AST=ST-Y-X to the target cell as part of the RRC re-configuration complete.

According to a further embodiment, the survival time equal to 3 times the transfer interval indicates that out of any 3 consecutive packets at least one has to be successfully delivered. If the transmission of the first two packets failed, then the third packet need to be transmitted with very high reliability that it is almost surely successfully received. Define available survival time (AST) as the remaining time of the total ST within which the next packet has to be transmitted successfully with high reliability. If the previous packet is received successfully, then the AST is equal to the ST. It is essential for the target gNB to know the AST, i.e., how long it is lapsed since the last successful transmission of the packet. The target gNB shall use this information to determine if it will be able to transmit the next packet with the required reliability. Example, if the AST is much smaller than ST and close the transfer interval, then the target gNB has to ensure that next packet has to be transmitted with very high reliability. Depending on the capability of the target gNB and/or the current load condition, the target gNB may not be able to support this stringent requirement. For this purpose, it is useful to indicate the AST from the source to the target gNB as part of the handover request message. As such AST information can be used as well by the target gNB for admission control purposes. During the HO response, the target gNB shall indicate the list of supported survival time (SST) i.e., the time duration within which the target gNB will be able to send the next packet successfully to the UE. The source gNB can utilize this information from different possible target gNBs and choose a most suitable target gNB. That is, during handover the current status of the survival time information is shared from the source to the target gNB. Furthermore, the supported survival time intervals are shared from the target gNB to the source gNB as a part of HO response. Moreover, the survival time related information can be part of the UE context.

According to an embodiment, information element (IE) that can be used for the signaling messages between the network elements can be as follows.

Survival Time Example IE

This IE indicates the Survival Time of the TSC QoS flow as defined in TS 23.501.

| IE/Group Name | Presence | Range | IE type and reference | Semantics description |
|---|---|---|---|---|
| Survival Time | M | | INTEGER (1 . . . , X, . . . ) | Survival Time expressed in units of the data burst periodicity of the TSC QoS flow, given by the value of the Periodicity IE. |

In the above example, the periodicity IE can refer to the time period between start of two bursts, e.g., as defined in 3GPP TS 23.501.

According to another embodiment, the UE provides the ST-Y to the target cell as part of the RRC re-configuration complete and the source cell directly provides to the target cell along with the SN status transfer, the time at which the last packet was transmitted to the UE. Based on this, the target cell derives the HO interruption time. Further, the target cell is informed on the applied PER per packet during the ST counter (e.g., in terms of PER Table). Either the source cell or the UE may provide this information.

According to another embodiment, a method is provided for enabling Survival Time (ST) awareness for Baseline Handover of New Radio, the method comprising: sending, by a source gNB, a handover request message including new information on a Survival Time and a ST Headroom (ST-Y) to a target gNB; receiving, at a target gNB, said ST headroom (ST-Y) during said handover (HO) request message from said source gNB; estimating, by said target gNB an HO interruption time (X); using, by said target gNB, said ST Headroom (ST-Y) and the estimated HO interruption time (X) to determine the amount of Survival time (ST) available for said target gNB to transfer a packet successfully to a User Equipment (UE), once said UE is connected to said target gNB; performing admission control, by said target gNB based on the current radio resources and said Available Survival Time (ST); sending, by said target gNB a Handover Request Acknowledgement to said source gNB; and providing, by said source gNB, a SN Status Transfer message or in a separate Xn message, an updated information on said ST Headroom (ST-Y) to said target gNB; providing by said UE, a final experienced ST Headroom (ST-Y)-X to said target gNB as a part of RRC Configuration Complete message or MAC control element (CE); wherein, sending, by a source gNB said ST headroom (ST-Y) during said handover (HO) request message allows said target gNB to reserve the required radio resources considering the ST headroom (ST-Y) or reject the handover request if said target gNB cannot accommodate the stringent requirement of said UE in case said ST headroom (ST-Y) is small.

According to another embodiment, an apparatus is provided for enabling Survival Time (ST) awareness for Baseline Handover of New Radio, wherein the apparatus comprises: a source gNB, configured to send a handover Request message including new information on a Survival Time (ST) and a ST Headroom (ST-Y) to a target gNB; a target gNB, configured to: receive said ST headroom (ST-Y) during said handover (HO) request message from said source gNB; estimate an HO interruption time (X); use, said ST Headroom (ST-Y) and the estimated HO interruption time (X) to determine the amount of Survival time (ST) available for said target gNB to transfer a packet successfully to a UE, once said UE is connected to said target gNB; perform admission control based on current radio resources and Available Survival Time (ST); send a Handover Request Acknowledgement to said source gNB; said source gNB, configured to provide a SN Status Transfer message or in a separate Xn message, an updated information on said ST Headroom (ST-Y) to said target gNB; a User Equipment (UE) configured to provide a final experienced ST Headroom (ST-Y)-X to said target gNB as a part of the RRC Configuration Complete message or MAC control element (CE); wherein, said source gNB is configured to send said ST headroom (ST-Y) during said handover (HO) request message which allows said target gNB to reserve the required radio resources considering the ST headroom (ST-Y) or reject the handover request if said target gNB cannot accommodate the stringent requirement of said UE in case said ST headroom (ST-Y) is small.

According to another embodiment, a method is provided for enabling Survival Time (ST) awareness in Conditional Handover (CHO) of New Radio (NR), comprising: sending, by a source gNB, a handover (HO) Request message including new information on a Survival Time (ST) and a ST Headroom (ST-Y) to one or more target gNBs; using, by said target gNBs, said ST Headroom (ST-Y) and a HO interruption time (X) to determine the amount of Survival time (ST) available for said one or more target gNBs to transfer a packet successfully to a User Equipment (UE); performing admission control, by said target gNB based on the current radio resources and Available Survival Time (ST);

sending, by said one or more target gNBs a Handover Request Acknowledgement to said source gNB; providing, by said source gNB, a new HO Request Update message, an updated information on said ST Headroom (ST-Y) to said one or more target gNBs; based on said providing, said one or more target eNBs respond with an Acknowledgement (ACK) or a Negative Acknowledgement (NACK) to said source gNB; providing, by said source gNB, said HO Request Update message periodically or considering said ST headroom updates of said UE; providing by said UE, a final experienced ST Headroom (ST-Y)-X to said target gNB as a part of the RRC Configuration Complete message or MAC control element (CE); wherein, sending, by a source gNB said ST headroom (ST-Y) during said handover (HO) request message allows said target gNB to reserve the required radio resources considering the ST headroom (ST-Y) or reject the handover request if said target gNB cannot accommodate the stringent requirement of said UE in case said ST headroom (ST-Y) is small.

According to another embodiment, an apparatus is provided for enabling Survival Time (ST) awareness in Conditional Handover (CHO) of New Radio (NR), wherein the apparatus comprises: a source gNB, configured to send a handover (HO) Request message including new information on a Survival Time (ST) and a ST Headroom (ST-Y) to one or more target gNBs; one or more target gNBs, configured to: use said ST Headroom (ST-Y) and a HO interruption time (X) to determine the amount of Survival time (ST) available for said one or more target gNBs to transfer a packet successfully to a User Equipment (UE); perform admission control based on the current radio resources and Available Survival Time (ST); send a Handover Request Acknowledgement to said source gNB; said source gNB, configured to provide a new HO Request Update message, an updated information on said ST Headroom (ST-Y) to said one or more target gNBs; based on said providing, one or more target gNB, configured to respond with an Acknowledgement (ACK) or a Negative Acknowledgement (NACK) to said source gNB; said source gNB, configured to provide said HO Request Update message periodically or considering the ST headroom updates of said UE; a User Equipment (UE) configured to provide a final experienced ST Headroom (ST-Y)-X to said one or more target gNBs as a part of the RRC Configuration Complete message or MAC control element (CE); wherein, said source gNB is configured to send said ST headroom (ST-Y) during said handover (HO) request message which allows said target gNB to reserve the required radio resources considering the ST headroom (ST-Y) or reject the handover request if said target gNB cannot accommodate the stringent requirement of said UE in case said ST headroom (ST-Y) is small.

According to another embodiment, a method is provided for enabling Survival Time (ST) awareness in Dual Active Protocol Stack Handover (DAPS) of New Radio (NR), the method comprising: sending, by a source gNB, a handover (HO) Request message including the new information on a Survival Time (ST) and a ST Headroom (ST-Y) to a target gNB; sending, by said target gNB a Handover Request Acknowledgement to said source gNB; providing, by said source gNB, an Early Forwarding Transfer message or in a separate interruption time (Xn) message, an updated information on said ST Headroom (ST-Y) to said target gNB; providing by said UE, a final experienced ST Headroom (ST-Y)-X for Uplink (UP) and (ST-Y) for Downlink (DL) to said target gNB as a part of the RRC Configuration Complete message or MAC control element (CE); wherein, sending, by a source gNB said ST headroom (ST-Y) during said handover (HO) request message allows said target gNB to reserve the required radio resources considering the ST headroom (ST-Y) or reject the handover request if said target gNB cannot accommodate the stringent requirement of said UE in case said ST headroom (ST-Y) is small.

According to another embodiment, an apparatus is provided for enabling Survival Time (ST) awareness in Dual Active Protocol Stack Handover (DAPS) of New Radio (NR), comprises: a source gNB, configured to send a handover (HO) Request message including new information on a Survival Time (ST) and a ST Headroom (ST-Y) to a target gNB; a target gNBs, configured to send a Handover Request Acknowledgement to said source gNB; a source gNB, configured to provide an Early Forwarding Transfer message or in a separate interruption time (Xn) message, an updated information on said ST Headroom (ST-Y) to said target gNB; a User Equipment (UE) configured to provide a final experienced ST Headroom (ST-Y)-X for Uplink (UP) and (ST-Y) for Downlink (DL) to said target gNB as a part of the RRC Configuration Complete message or MAC control element (CE); wherein, said source gNB is configured to send said ST headroom (ST-Y) during said handover (HO) request message which allows said target gNB to reserve the required radio resources considering the ST headroom (ST-Y) or reject the handover request if said target gNB cannot accommodate the stringent requirement of said UE in case said ST headroom (ST-Y) is small.

According to another embodiment, a method is provided for Survival Time (ST) awareness for intra-Central unit (CU) and intra-Distributed Unit (DU) Handover of New Radio (NR), the method comprising: sending, by a source gNB-DU, an UL RRC Message Transfer including new information on a Survival Time (ST) and a ST Headroom (ST-Y) to a target gNB-CU; sending, by a gNB-CU, a UE Context Setup Request message providing the information on a Survival Time (ST) and a ST Headroom (ST-Y) to target gNB-DU; providing, by said source gNB-DU, an updated information on said ST Headroom (ST-Y) in the Downlink Data Delivery Status or in a separate Xn message or in UE Context Modification Response message to gNB-CU; providing by said UE, a final experienced ST Headroom (ST-Y)-X to said target gNB CU as a part of the RRC Configuration Complete message or MAC control element (CE); wherein, sending, by a source gNB said ST headroom (ST-Y) during said handover (HO) request message allows said target gNB to reserve the required radio resources considering the ST headroom (ST-Y) or reject the handover request if said target gNB cannot accommodate the stringent requirement of said UE in case said ST headroom (ST-Y) is small.

According to another embodiment, an apparatus is provided for Survival Time (ST) awareness for intra-Central unit (CU) and intra-Distributed Unit (DU) Handover of New Radio (NR), comprises: a source gNB-DU configured to send an UL RRC Message Transfer including new information on a Survival Time (ST) and a ST Headroom (ST-Y) to a gNB-CU; a gNB-CU configured to send a UE Context Setup Request message providing the information on a Survival Time (ST) and a ST Headroom (ST-Y) to target gNB-DU; said source gNB-DU configured to provide an updated information on said ST Headroom (ST-Y) in the Downlink Data Delivery Status or in a separate Xn message or in UE Context Modification Response message; a user equipment (UE) configured to provide a final experienced ST Headroom (ST-Y)-X to said gNB-CU as a part of the RRC Configuration Complete message or MAC control element (CE); wherein, said source gNB is configured to send said ST headroom (ST-Y) during said handover (HO) request message which allows said target gNB to reserve the required radio resources considering the ST headroom (ST-Y) or reject the handover request if said target gNB cannot accommodate the stringent requirement of said UE in case said ST headroom (ST-Y) is small.

BRIEF DESCRIPTION OF FIGURES

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DETAILED DESCRIPTION

Figure 1:
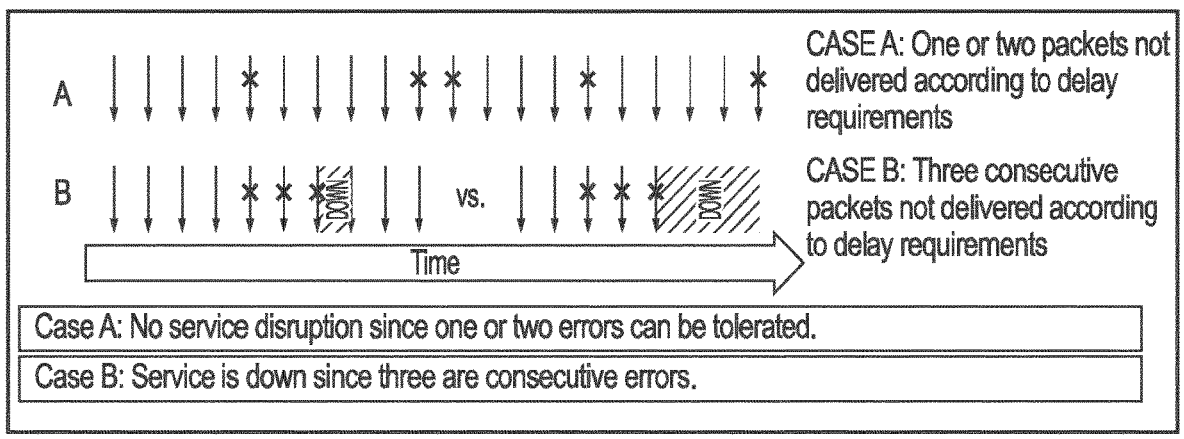
FIG. 1 illustrates a pictorial representation of survival time with respect to a cyclic traffic.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements. In the drawings, proposed newly introduced information elements are presented withing parentheses, where the impacted signaling messages are marked with dashed boxes.

It is to be noted, however, that the reference numerals used herein illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 2:
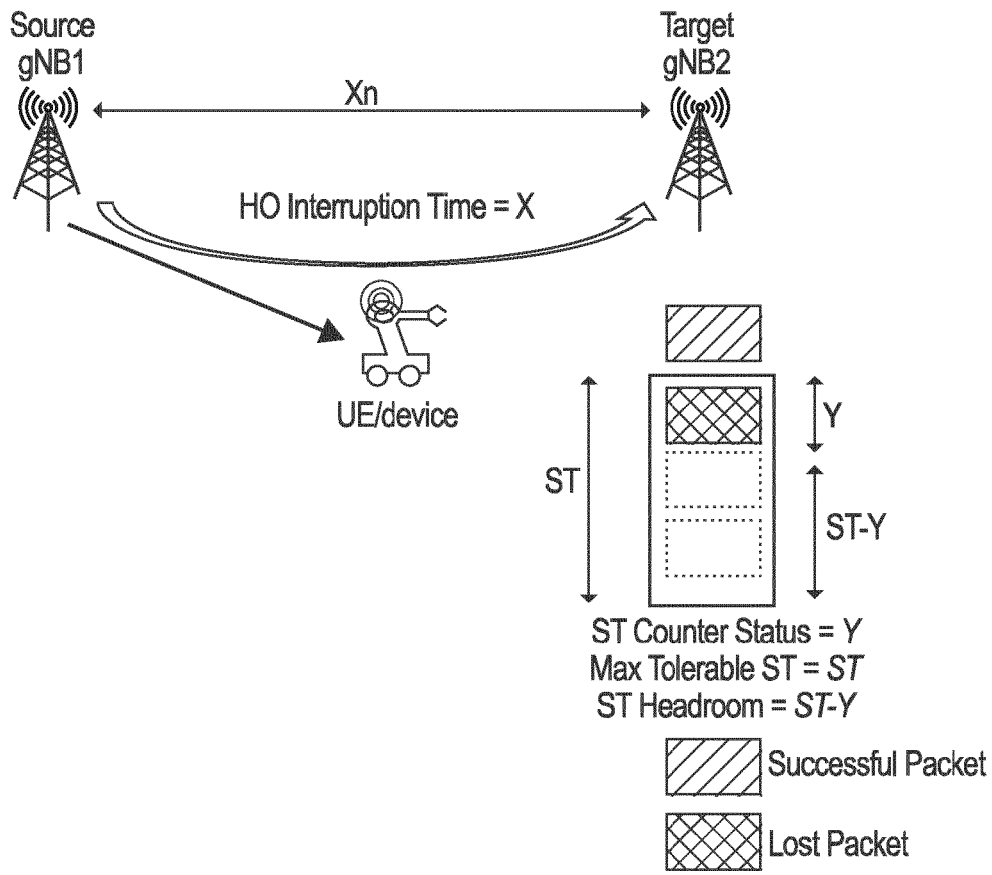
FIG. 2 illustrates an exemplary embodiment of wireless communication framework in accordance with an embodiment of the present invention.

FIG. 2 depicts examples of simplified system architectures showing some elements and functional entities, all being logical units, whose implementation may differ from what is shown. The connections shown in FIG. 2 are logical connections; the actual physical connections may be different. It is apparent to a person skilled in the art that the system may also comprise other functions and structures than those shown in FIG. 2.

The exemplary embodiments are not, however, restricted to the system given as an example but a person skilled in the art may apply the solution to other communication systems provided with necessary properties.

The example of FIG. 2 shows a part of an exemplifying radio access network. FIG. 2 shows user device configured to be in a wireless connection on one or more communication channels in a cell with a source node (such as (e/g)NodeB1) and a target node (such as (e/g)NodeB2). The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to.

The NodeB may also be referred to as a base station, an access point or any other type of interfacing device including a relay station capable of operating in a wireless environment. The (e/g)NodeB may include or be coupled to transceivers.

From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc. The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node.

The user device may refer to a portable computing device that includes wireless mobile communication devices operating with or without a subscriber identity module (SIM), including, but not limited to, the following types of devices a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IOT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 2) may be implemented. 5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE.

Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHZ-cmWave, below 6 GHz-cmWave-mmWave). One of the concepts considered to be used in 5G networks may be network slicing in which multiple independent and dedicated virtual sub networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, realtime analytics, time-critical control, healthcare applications). The communication system may also be able to communicate with other networks, such as a public switched telephone network or the Internet, or utilize services provided by them. The communication network may also be able to support the usage of cloud services, for example at least part of core network operations may be carried out as a cloud service. The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU) and non-real time functions in a centralized manner (in a central unit, CU) may be enabled for example by application of cloud RAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IOT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite in the mega constellation may cover several satellite-enabled network entities that create on ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g) NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); one or more distributed units (DUs) that may be used for the so called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP). The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU.

The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station. Cloud computing platforms may also be used to run the CU and/or DU.

The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

According to an embodiment of the present invention, the target cell "may" know/derive to some extent some information about the Survival Timer (ST) headroom from "SN Status Transfer" message that is sent by the source gNB to target gNB after receiving "Handover Request Acknowledge". However, deriving the ST headroom information from "SN Status Transfer" message (if possible at all) may not be enough as the target gNB cannot leverage this information in admission control which is performed before "Handover Request Acknowledge" is sent to source gNB and before the target gNB receives "SN Status Transfer".

According to some embodiments described herein, the present invention provides the target gNB to receive the ST headroom during the handover request message from the source to target gNB which allows the target gNB to 1) reserve the required radio resources taking into account the ST headroom (reserve more resources in case the ST headroom is small or 2) reject the handover request if the target gNB cannot accommodate the stringent requirement of the UE in case the ST headroom is small.

Within the framework of this invention, ST can either be represented in terms of "Time" or "number of lost packets". If ST is provided in terms of time, e.g., absolute time, the 5GS, e.g., CN or RAN, may determine the corresponding number of packets/packet bursts that map to the ST. A mixture of "number of packets" and "absolute time" can also be utilized.

In certain embodiments, the supported survival time headroom comprises a single fixed value or a function of one or more parameters, such as signal strength, load, services or network slices which the UE uses, etc. In case the UE is associated to multiple services or slices with different survival time requirements the target network node would consider all those different requirements and provide the response accordingly.

Hence, the invention enables the ST awareness for different mobility procedures. For each mobility procedure, the details on attaining the ST awareness are provided along with the example message sequence charts (MSCs).

Figure 3:
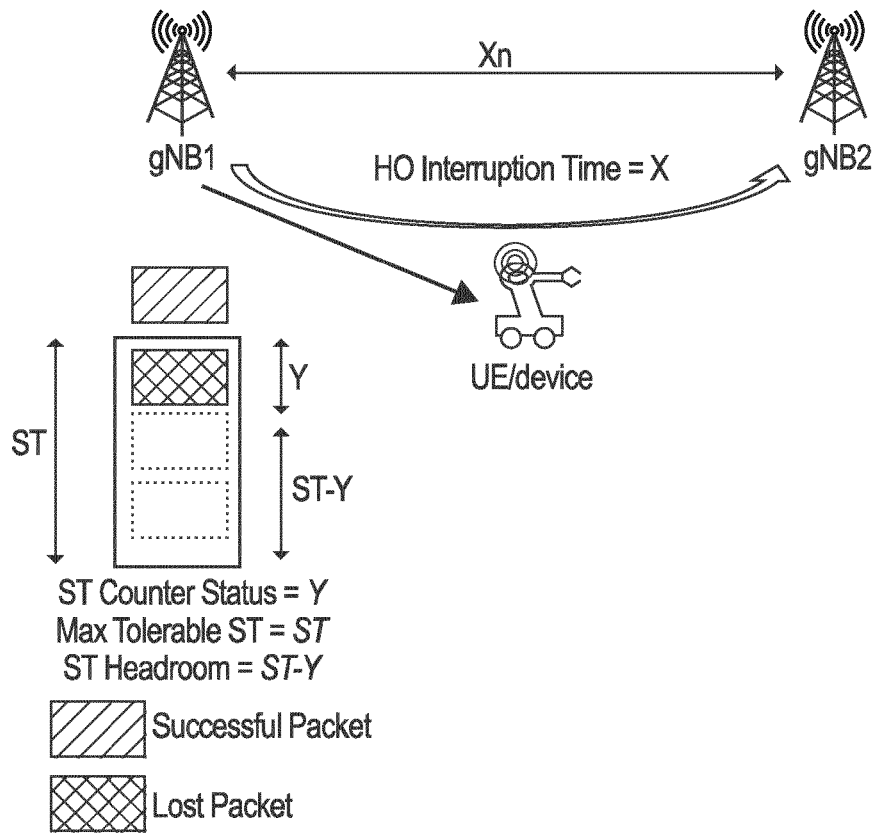
FIG. 3 illustrates a signalling diagram related to Survival Time awareness in Baseline Handover (BHO) in New Radio (NR) in accordance with an embodiment of the present invention.
Figure 3:
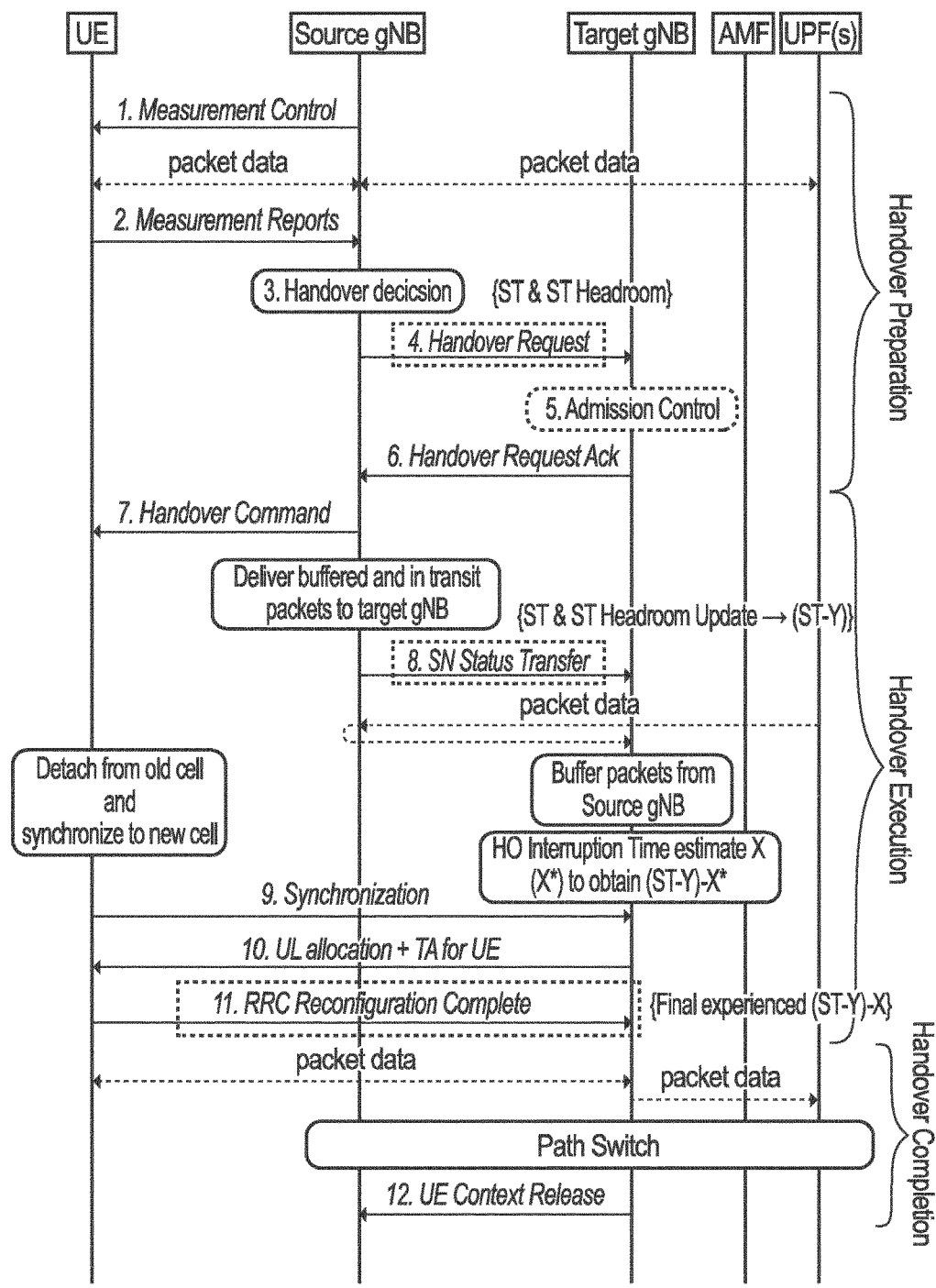

ST Awareness in Baseline Handover (BHO) of New Radio (NR):

FIG. 3 illustrates a signalling diagram related to Survival Time awareness in Baseline Handover (BHO) in New Radio (NR) in accordance with an embodiment of the present invention. The handover (HO) Request message, is sent from source gNB to target gNB, including the new information on ST & ST Headroom (ST & ST-Y). The target gNB uses the ST headroom i.e., ST-Y and the estimated interruption time (X) to determine how much of the survival time is available for the target gNB to transfer a packet successfully to the UE (after the UE is connected to it). Depending on the current radio resources and the available survival time the target gNB performs admission control.

Further, the source gNB provides to target gNB, SN Status Transfer message or in a separate Xn message provides the updated information on ST Headroom (ST-Y). Providing an update is useful since the UE continues to receive/send data with the source cell during handover preparation. The provisioning of updated ST headroom can enable target cell's awareness on how urgent and critical the communication service is, such that the target cell can determine, e.g., modulation and coding scheme, it would configure for the UE after the UE successfully accesses the target node.

While estimating the HO interruption time by the target gNB, X can be estimated/derived by the target cell by checking the packets that have not been delivered yet to the UE. The estimate X* can be used, e.g., for UL allocation. The source gNB can also explicitly provide time at which last packet is delivered to the UE.

In a further embodiment, UE provides in the RRC Configuration Complete message or MAC control element (CE) the final experienced ST Headroom, i.e., (ST-Y)-X.

ST Awareness for Conditional Handover (CHO)

Figure 4:
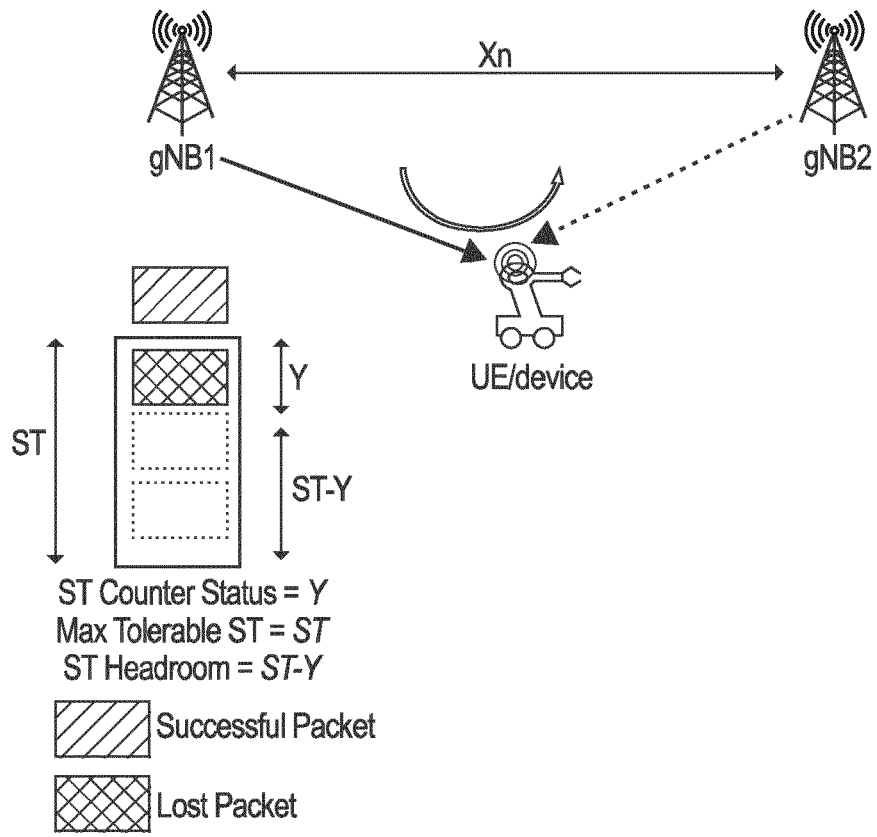
FIG. 4 illustrates a signalling diagram related to Survival Time awareness during Conditional Handover (CHO) in accordance with an embodiment of the present invention.
Figure 4:
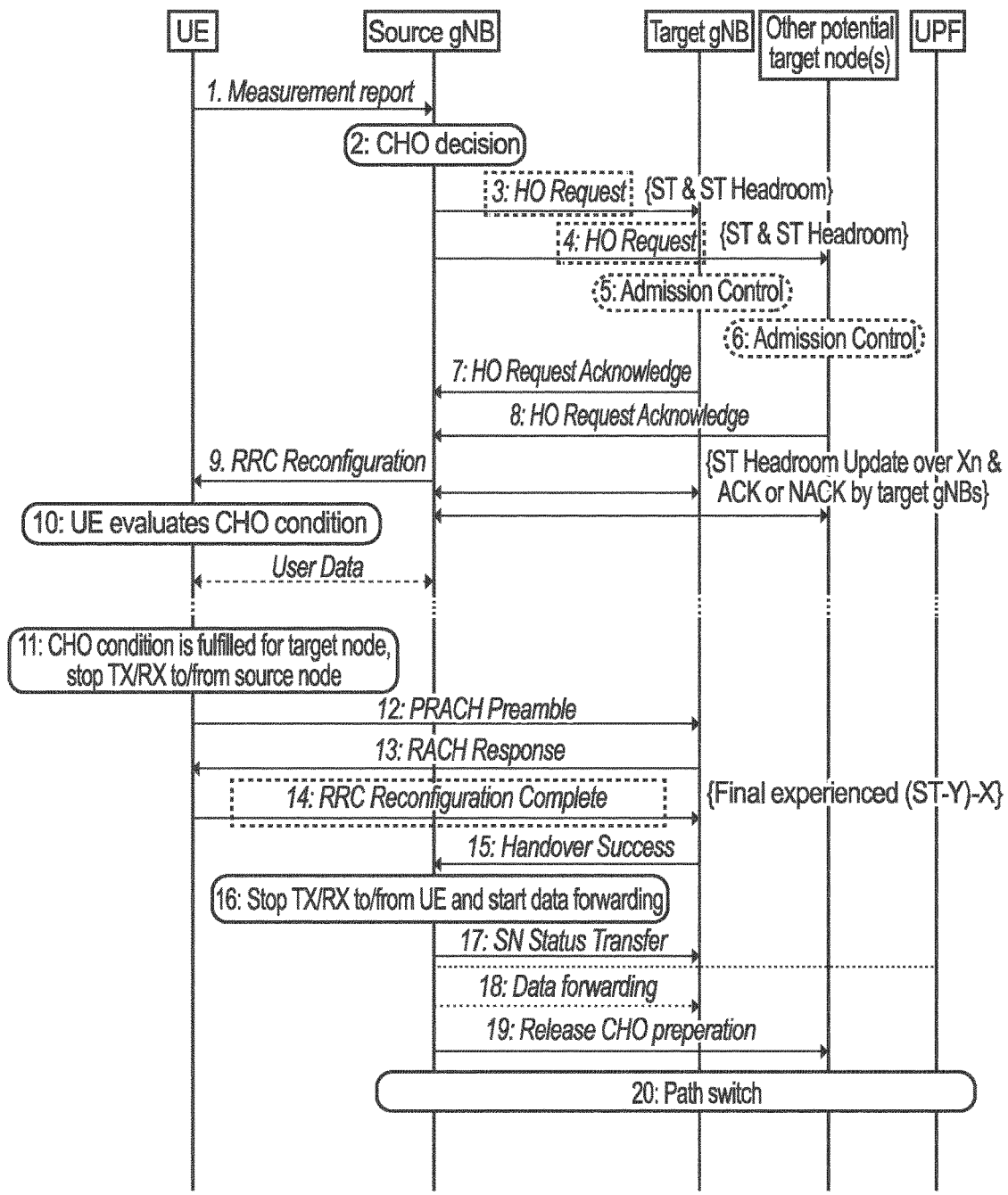

FIG. 4 illustrates a signalling diagram related to Survival Time awareness during Conditional Handover (CHO) in accordance with an embodiment of the present invention.

The HO Request, is sent from source gNB to target gNB or other potential target nodes(s), including the message of the new information on ST & ST Headroom (ST & ST-Y).

In another embodiment, a new HO Request Update message (not shown in FIG. 4) provides the updated information on ST Headroom where the target gNBs respond with ACK (acknowledging the reception of the update) or NACK. The HO Request Update message can be provided periodically or considering the ST headroom updates of the UE.

In a further embodiment, UE provides in the RRC Configuration Complete message or MAC CE the final experienced ST Headroom, i.e., (ST-Y)-X.

ST Awareness for DAPS HO

Figure 5:
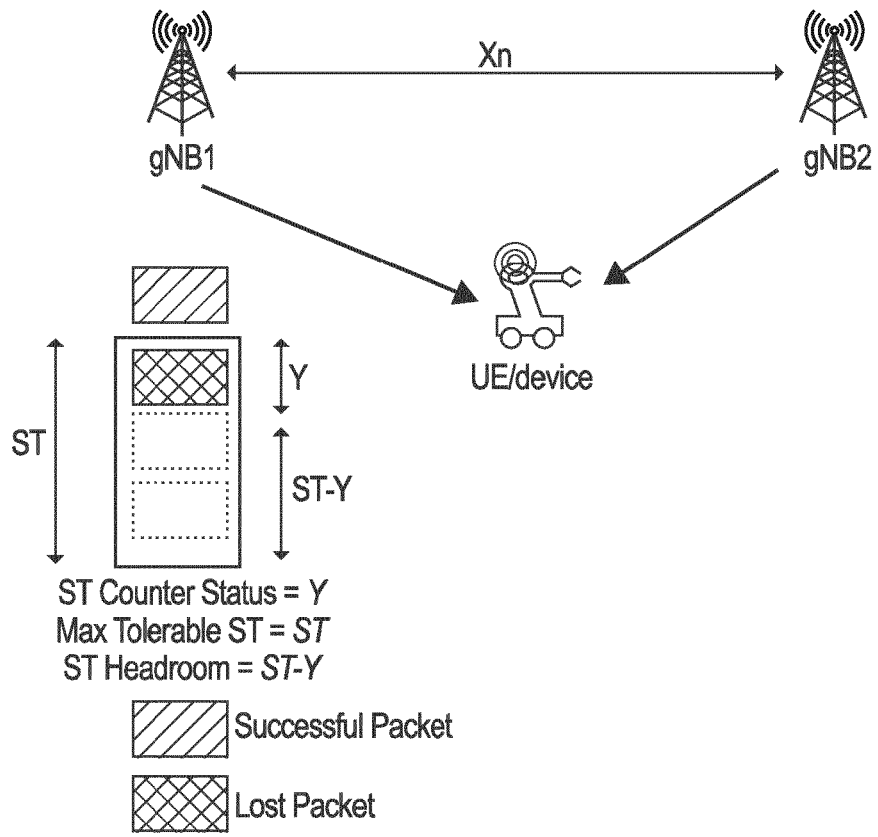
FIG. 5 illustrates a signalling diagram related to Survival Time awareness in DAPS (Dual Active Protocol Stack) hand over (HO) in accordance with an embodiment of the present invention.
Figure 5:
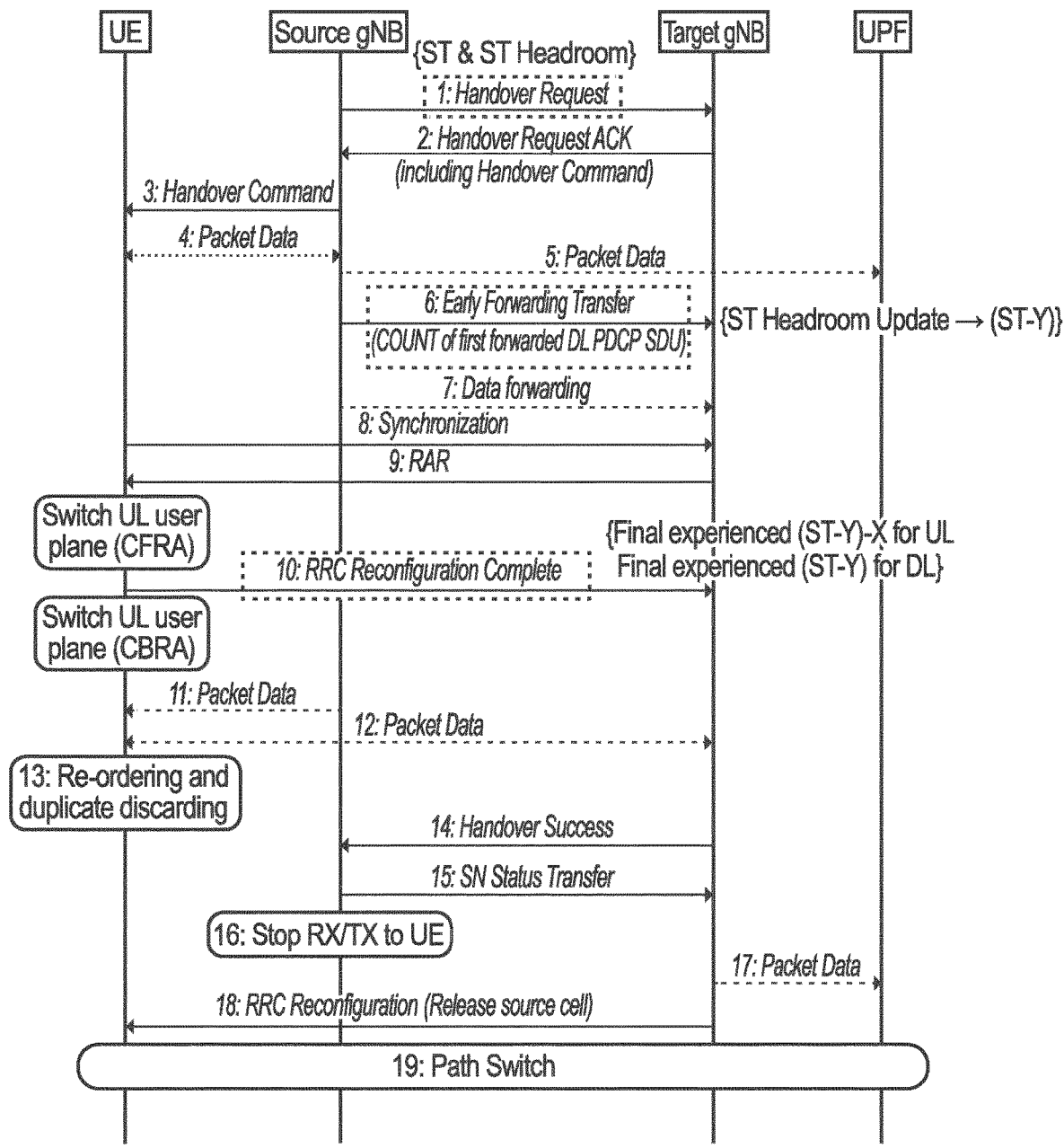

FIG. 5 illustrates a signalling diagram related to Survival Time awareness in DAPS (Dual Active Protocol Stack) hand over (HO) in accordance with an embodiment of the present invention.

The HO Request message, from source gNB to target Node, includes the new information on ST & ST Headroom (ST & ST-Y).

In a further message from source gNB i.e. an Early Forwarding Transfer message or in a separate interruption time (Xn) message, an updated information on ST Headroom is provided to target gNB.

It is provided in the RRC Configuration Complete message or MAC CE the final experienced ST Headroom, i.e., (ST-Y)-X for UL & ST-Y for DL. In DAPS, the radio communication between the UE and source cell continues for downlink after sending the HO command and as such the ST counter Y can be updated continuously. So, it may be required to differentiate between downlink (DL) and uplink (UL).

ST Awareness for Intra-CU HO

Figure 6:
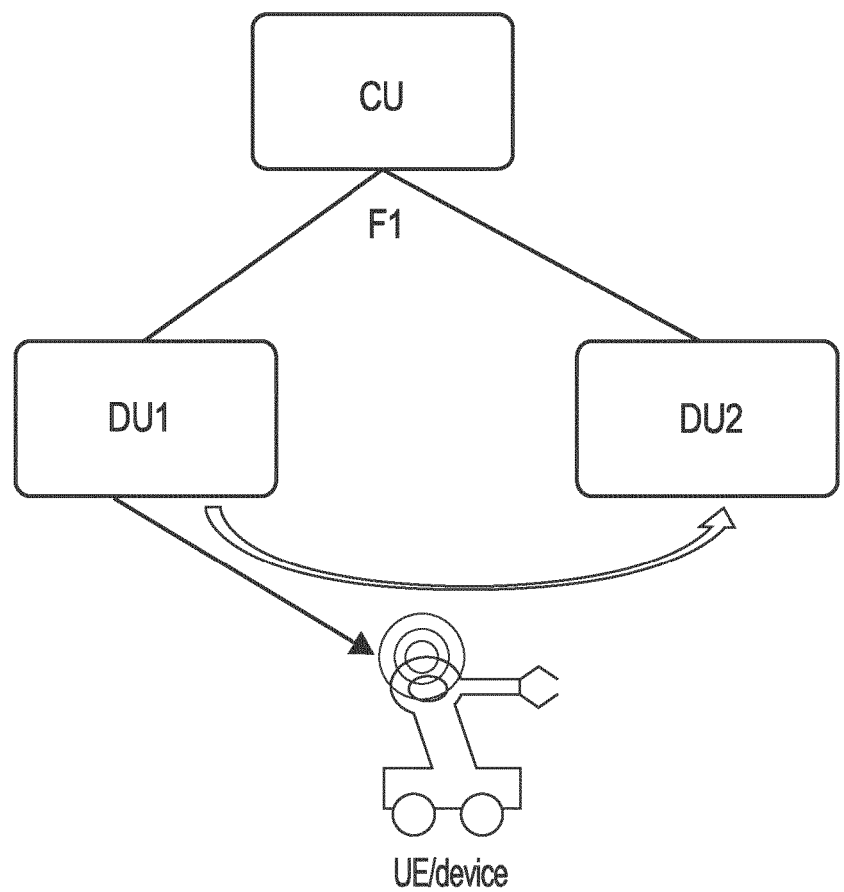
FIG. 6 illustrates a signalling diagram related to Survival Time awareness in Intra-CU (Central Unit) and Inter-DU (Distributed Unit) handover in accordance with an embodiment of the present invention.
Figure 6:
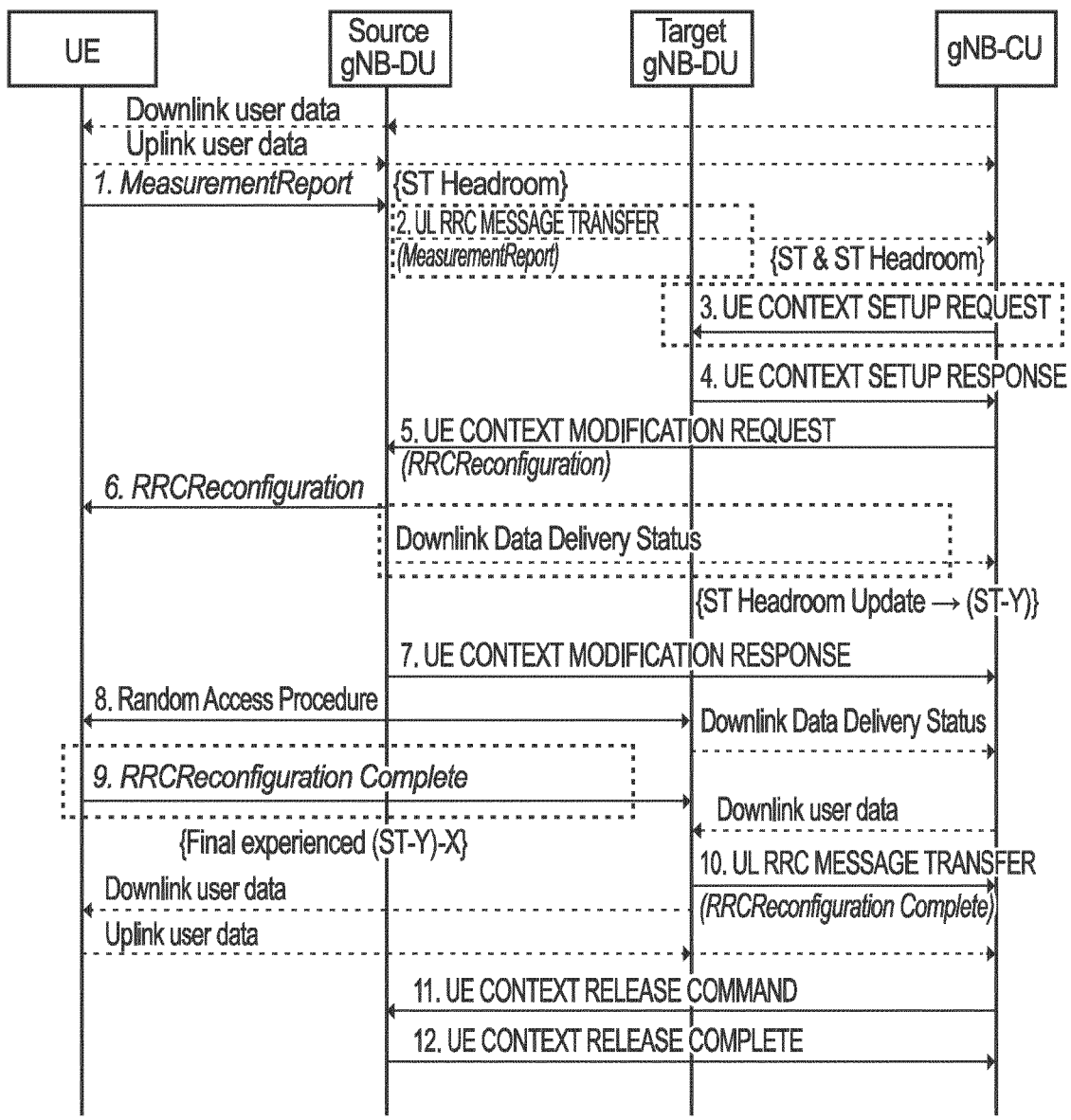

FIG. 6 illustrates a signalling diagram related to Survival Time awareness in Intra-CU (Central Unit) and Inter-DU (Distributed Unit) handover in accordance with an embodiment of the present invention.

The deployment may be based on the disaggregated gNB implementation, i.e., central unit (CU) and distributed units (DUs).

UL RRC Message Transfer, is sent from source gNB DU to target gNB CU, including the new information on ST Headroom (ST-Y).

The UE Context Setup Request message, is sent from gNB CU to target gNB-DU, providing the information on ST and ST Headroom (ST & ST-Y).

Further, the updated information on ST Headroom is provided in the Downlink Data Delivery Status or in a separate Xn message or in UE Context Modification Response message.

UE provides in the RRC Configuration Complete message or MAC CE the final experienced ST Headroom, i.e., (ST-Y)-X.

In another embodiments, the mobility procedures may be executed jointly, e.g., CHO & DAPS may be performed together. In the table below, in such cases, the impacted mechanisms are outlined. DC refers to dual connectivity.

| Scenario | ST Headroom Update | Final experienced ST Headroom |
|---|---|---|
| CHO + DAPS | Based on the DAPS case | Based on the DAPS case |
| BHO + DC | Each access node needs to build an estimate based on the termination type of the traffic and this needs to take into account the split bearer status or the cross bearer status of the leg. | May need new UL message based on completion of SN reconfiguration (for split bearer). For cross bearer, UE needs awareness of which leg to report this for. |
| CHO + DC | Based on the BHO + DC case but from a UE perspective | Based on the BHO + DC case but from a UE perspective |
| DAPS + DC | Based on the DAPS case for Rel-16 New estimation for DAPS with SN, target MN case | Based on the DAPS case for Rel-16 New estimation for DAPS with SN, target MN case |

According to an advantageous embodiment of the present invention, as Survival Time is critical for the communication service availability thus, RAN is made aware of the ST at all stages of the UE connectivity, including inter-cell and inter-DU mobility. The ST headroom is communicated from the source gNB to target gNB during the handover preparation phase (as part of the handover request message) which can be leveraged by the target gNB in admission control.

Thus, the ST status during mobility procedures survival time awareness ensures service continuity by reducing latency on the completion of the mobility procedures. The transmission schemes can be adjusted by the target cell of handover depending on the status of the ST counter.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

LIST OF ABBREVIATIONS

5MBS: 5G Multicast Broadcast Service
5GC: 5G CN
5GS: 5G system
AN: Access Network
BHO: Baseline Handover
CD/CI: Continuous Delivery/Continuous Integration
CHO: Conditional Handover
CN: Core Network
CP: Control Plane
CU CP: Central Unit CP (see 38.300)
CU UP: Central Unit User Plane (see 38.300)
DAPS: Dual Active Protocol Stack
DSF: Data Storage Function
DU: Distributed Unit (see 38.300)
NEF: Network Exposure Function
NRF: Network Repository Function
P2P: Peer to peer
RAN: Radio Access Network
SB: Service-based
SBA: Service-based Architecture
SBI: Service-based Interface
SBMA: Service-based Management Architecture
SBI: Service Based Interface
SCP: Signaling connection proxy
SeGW: Security Gateway
ST: Survival Time
UE: User Equipment
UP: User Plane

We claim:

1. A target gNB comprising circuitry configured to:
receive, from a source gNB, a handover (HO) request message including information on a Survival Time (ST) and a ST Headroom;
estimate an HO interruption time;
determine, based at least in part on said ST Headroom and said estimated HO interruption time, an amount of Survival Time available for said gNB to transfer a packet to a user equipment (UE), once said UE is connected to said gNB;
perform admission control based on current radio resources and said available Survival Time; wherein the performing admission control comprising: determine whether to accept handover based at least on whether said gNB can support said available Survival Time.

2. The target gNB as claimed in claim 1, wherein said circuitry is further configured to:
estimate said HO interruption time by checking packets that have not been delivered to said UE.

3. The target gNB as claimed in claim 2, wherein said circuitry is further configured to:
allocate uplink resources using said estimated HO interruption time.

4. The target gNB as claimed in claim 1, wherein said circuitry is further configured to:
receive, from said source gNB, a time at which a last packet is delivered to said UE.

5. The target gNB as claimed in claim 1, wherein said information on ST headroom comprises a single fixed value or one or more parameters of signal strength, load, services or network slices.

6. The target gNB as claimed in claim 1, wherein said circuitry is further configured to:
receive, in a SN Status Transfer message or in a separate Xn message, an updated information on said ST headroom from said source gNB;
determine, based at least in part on said updated information on said ST headroom, a modulation and coding scheme to configure for said UE once said UE successfully accesses said target node.

7. The target gNB as claimed in claim 1, wherein said circuitry is further configured to:
receive, from the UE as part of a RRC Configuration Complete message or a MAC control element, a final experienced ST headroom;
use said final experienced ST headroom to transmit a packet to said UE.

8. The target gNB as claimed in claim 1, wherein said circuitry is further configured to:
receive the handover (HO) request message during a Baseline Handover (BHO) procedure, or a Conditional Handover (CHO) procedure, or a Dual Active Protocol Stack Handover (DAPS) procedure.

9. A method, comprising:
receiving at a target gNB, from a source gNB, a handover (HO) request message including information on a Survival Time (ST) and a ST Headroom;
estimating an HO interruption time;
determining, based at least in part on said ST Headroom and said estimated HO interruption time, an amount of Survival Time available for said target gNB to transfer a packet to a user equipment (UE), once said UE is connected to said target gNB;
performing admission control based on current radio resources and said available Survival Time; wherein the performing admission control comprises: determining whether to accept handover based at least on whether said target gNB can support said available Survival Time,
receiving, in a SN Status Transfer message or in a separate Xn message, an updated information on said ST headroom from said source gNB.

10. The method as claimed in claim 9, further comprising: estimating said HO interruption time by checking packets that have not been delivered to said UE.

11. The method as claimed in claim 10, further comprising:
allocating uplink resources using said estimated HO interruption time.

12. The method as claimed in claim 9, further comprising: receive, from said source gNB, a time at which a last packet is delivered to said UE.

13. The method as claimed in claim 9, wherein said information on ST headroom comprises a single fixed value or one or more parameters of signal strength, load, services or network slices.

14. The method as claimed in claim 9, further comprising:
receiving, in a SN Status Transfer message or in a separate Xn message, an updated information on said ST headroom from said source gNB;
determining, based at least in part on said updated information on said ST headroom, a modulation and coding scheme to configure for said UE once said UE successfully accesses said target gNB.

15. The method as claimed in claim 9, further comprising:
receiving, from the UE as part of a RRC Configuration Complete message or a MAC control element, a final experienced ST headroom;
using said final experienced ST headroom to transmit a packet to said UE.

16. The method as claimed in claim 9, further comprising:
receiving the handover (HO) request message during a Baseline Handover (BHO) procedure, or a Conditional Handover (CHO) procedure, or a Dual Active Protocol Stack Handover (DAPS) procedure.

* * * * *